US008686273B2

(12) United States Patent
Danty et al.

(10) Patent No.: US 8,686,273 B2
(45) Date of Patent: *Apr. 1, 2014

(54) RECORDING AND SELECTING A REGION OF A MEDIA TRACK

(75) Inventors: John Danty, Calgary (CA); Jan-Hinnerk Helms, Hamburg (DE); Gerhard Lengeling, Los Altos, CA (US); Alexander Soren, San Francisco, CA (US); Matt Evans, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1550 days.

This patent is subject to a terminal disclaimer.

(21) Appl. No.: 11/834,675

(22) Filed: Aug. 6, 2007

(65) Prior Publication Data

US 2009/0043589 A1   Feb. 12, 2009

(51) Int. Cl.
*A63H 5/00* (2006.01)
*G04B 13/00* (2006.01)
*G10L 19/00* (2013.01)

(52) U.S. Cl.
USPC .............................. 84/609; 84/610; 704/500

(58) Field of Classification Search
USPC ............... 704/200, 500–504; 700/94; 84/609, 84/610, 634
See application file for complete search history.

(56) References Cited

U.S. PATENT DOCUMENTS

| 5,467,288 | A  | * | 11/1995 | Fasciano et al. ............... 715/716 |
| 6,222,549 | B1 |   | 4/2001  | Hoddie |
| 7,058,882 | B2 | * | 6/2006  | Kobayashi ..................... 715/204 |
| 7,642,442 | B2 |   | 1/2010  | Adam et al. |
| 7,856,424 | B2 | * | 12/2010 | Cisler et al. ................... 707/654 |
| 2004/0103233 | A1 | * | 5/2004 | Shinkai et al. ................. 710/260 |
| 2004/0159221 | A1 |   | 8/2004 | Camiel |

FOREIGN PATENT DOCUMENTS

| EP | 0282779 A1 | 9/1988 |
| EP | 0438299 A2 | 7/1991 |
| GB | 2294355 A  | 4/1996 |

OTHER PUBLICATIONS

David Pogue, *GarageBand 2 The Missing Manual*, Aug. 2005, O'Reilly Media, Sebastopol, California, USA [cover, title page and Table of Contents (6 pages total)].
Mary Plummer, *GarageBand 3 Create and Record Music on a Mac*, 2006, Peachpit Press, Berkeley, California, USA [cover, title page and Table of Contents (6 pages total)].
PCT International Search Report and Written Opinion for PCT International Appln No. PCT/US2008/002564, mailed on Jul. 15, 2008 (14 pages).

* cited by examiner

*Primary Examiner* — Angela A Armstrong
(74) *Attorney, Agent, or Firm* — Fletcher Yoder PC

(57) ABSTRACT

A program product, a graphical user interface, a computer system including such a graphical user interface and method for recording and selecting a region of a media track are described. Such a method comprises storing multiple takes of the same region of a media track and storing a data structure representing a take container to store multiple takes.

24 Claims, 2 Drawing Sheets

RECORDING AND SELECTING A REGION OF A MEDIA TRACK

This application claims the benefit of the filing date of U.S. application Ser. No. 11/713,231, which was filed on Mar. 1, 2007. The contents of U.S. application Ser. No. 11/713,231 are incorporated by reference as part of this application.

This application relates to recording and selecting an audio region.

BACKGROUND

Recently, music projects that in the past would have required an array of professional studio equipment can now be completed in a home or project studio, using a personal computer and readily available resources. A personal computer with a fast processor and enough RAM can serve as a workstation for recording, arranging, mixing, and producing complete music projects, which can be played back on the computer, burnt on a CD or DVD, or distributed over the Internet.

A user of such a program for producing complete music projects can choose among a lot of alternative window arrangements depending on the workflow he wants to conduct. There are, for example, different window arrangements for editing a selected track or for showing the mixer to manipulate different channels.

One feature which may be used for music production is cycle recording. Cycle or loop recording means that a specified time interval of a music project is repeated several times, with each repetition creating a new recording. Each of these recordings is saved in a separate track. Afterwards, it is possible to use material of those different tracks to compose one final music region in one track.

SUMMARY OF THE DESCRIPTION

In one aspect, a method for recording and selecting an audio region is provided. Such a method may feature operations such as storing multiple takes of the same audio region and storing a data structure representing a take container to store multiple takes. When recording the same region of an audio part multiple times, each of those recordings is called "take".

Certain embodiments may include one or more of the following features. The take container may be associated with a single region on a single track. Furthermore, a take container may be displayed with a first indication showing how many takes are stored in the take container.

The takes in the take container may be numbered and the take container may be displayed with a second indication showing which take is currently selected.

A menu may be associated with the take container. The menu may be used to select one of the multiple takes as the currently selected take. The menu may be accessed via an icon displaying the second indication showing which take is currently selected. In certain embodiments, the menu may further provide for functionalities of deleting one or more takes stored within the take container or deleting all takes stored in the take container but the currently selected take. At least for certain embodiments, no first indication showing how many takes are stored in the take container and no second indication showing which take is currently selected may be displayed, if the take container contains only one take.

Certain embodiments may have one or more of the following advantages. The take container may be a data structure used in a computer's operating system to represent a subdirectory or logical folder or it may be a data structure of an application program or a file system of a data processing system. When recording the same region of an audio part multiple times, each of those recordings is called "take". There are no restrictions with respect to the contents of those takes. Different takes may have similar contents but likewise their contents can also be very different from each other. The take container of at least certain embodiments allows that multiple takes of, for example, a cycle recording are all associated with a single region on a single track. Thus, it is no longer necessary to compile an audio region manually out of multiple tracks when working with several takes of a cycle recording.

At least according to certain embodiments, the take container may feature indications displaying, for example, how many takes are in the take container and which take is currently selected. Furthermore, it is possible that the take container is displayed so that its name and/or a graphical impression of the content of the currently selected version are given. To give a better impression of the recorded data, it is possible to display waveform data for each take. Therefore, the user can easily grasp how many versions of the audio region are within the take container and which of those is currently selected. At least in certain embodiments, the audio region will contain music contents.

In certain embodiments, the user can select one take of the multiple takes stored within the take container. This selection is preferably done via a menu which may be accessed by an icon associated with the take container. That icon may show the number of the currently selected take. Accordingly, at least certain embodiments enable the user to easily record multiple takes and then to select one of those. It is advantageous, at least in some embodiments, that the user, who might not be a professional, is provided with an easily understandable and intuitive process which does not tend to confuse by providing more information than is desirable.

These embodiments may be implemented by using a method, a program, a program product, a user interface, a computer system, a data processing system, a consumer electronic device or any combination of such implementations.

Other aspects, features, and advantages will be apparent from the following detailed description, the drawings, and the claims.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc., 2007.

When recording the same region of an audio part (e.g. a guitar solo) multiple times, each of those recordings is called "take". In one example, this same region may be specified by a portion of a musical score, and is typically one or more bars of the musical score, such as a score written in 4/4 time. The actual sound in each take may only be slightly different, but the performance of the take is of the same region. In another example, each take may contain an improvisation for the same region. Accordingly, the different takes do not need to be similar. There are many other purposes for which takes may also be used. Takes are usually created by recording in cycle mode (also called loop mode), but may also be created by recording over existing regions of an audio track.

At least in certain embodiments, a plurality of takes are stored in a take container. The takes are preferably not stored in different tracks. The take container may be a region of the currently selected track (e.g. a single audio track or single movie track) which includes audio.

Figure 1:
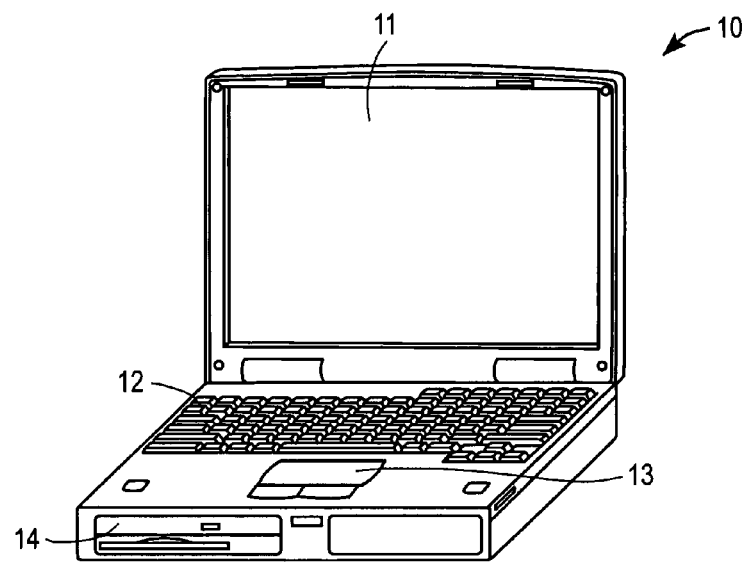
FIG. 1 is a schematic view of a computer.

FIG. 1 illustrates a data processing system 10 such as a computer system which may include a graphical user interface which is displayed on a display device such as a screen. The computer system comprises a screen 11 which is connected to a processing system incorporating a processor and a memory such as a semiconductor memory (e.g. RAM) and/or a magnetic memory. The computer system may also include a keyboard 12, a touch pad 13 and a mouse (not shown) connected to the processing system.

The processing system 10 includes, in one embodiment, system computer software for controlling the computer system. The software also includes control of the graphical user interface. The software may be downloaded from a server through a network or stored on an optical media, such as CD-ROM 14 or stored on other machine readable media (e.g. non-volatile memory such as magnetic hard drive or flash memory).

The processing system 10 may be used for recording, arranging, mixing, and producing complete music projects, which can be played back, burnt on a CD or DVD, or distributed over the Internet.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CDROMs, and magneticoptical disks, readonly memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

FIG. 2B of U.S. Pat. No. 6,222,549, which is hereby incorporated herein by reference, shows one example of a data processing system, such as a computer system, which may be used with the present invention. Note that while this Figure illustrates various components of a data processing system, it is not intended to represent any particular architecture or manner of interconnecting the components as such details are not germane to the present invention. It will also be appreciated that network computers, personal digital assistants (PDAs), cellular telephones, handheld computers, special purpose computers, entertainment systems and other data processing systems and consumer electronic devices which have fewer components or perhaps more components may also be used with the present invention. The system of this Figure may, for example, be a Macintosh computer from Apple Inc.

A machine readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of storage systems.

It will be apparent from this description that aspects of the inventions may be embodied, at least in part, in software. That is, the techniques may be carried out in a computer system or other data processing system in response to its processor or processing system executing sequences of instructions contained in a memory, such as RAM, etc. In various embodiments, hardwired circuitry may be used in combination with the software instructions to implement the present inventions. Thus, the techniques are not limited to any specific combination of hardware circuitry and software, nor to any particular source for the instructions executed by the data processing systems.

Figure 2:
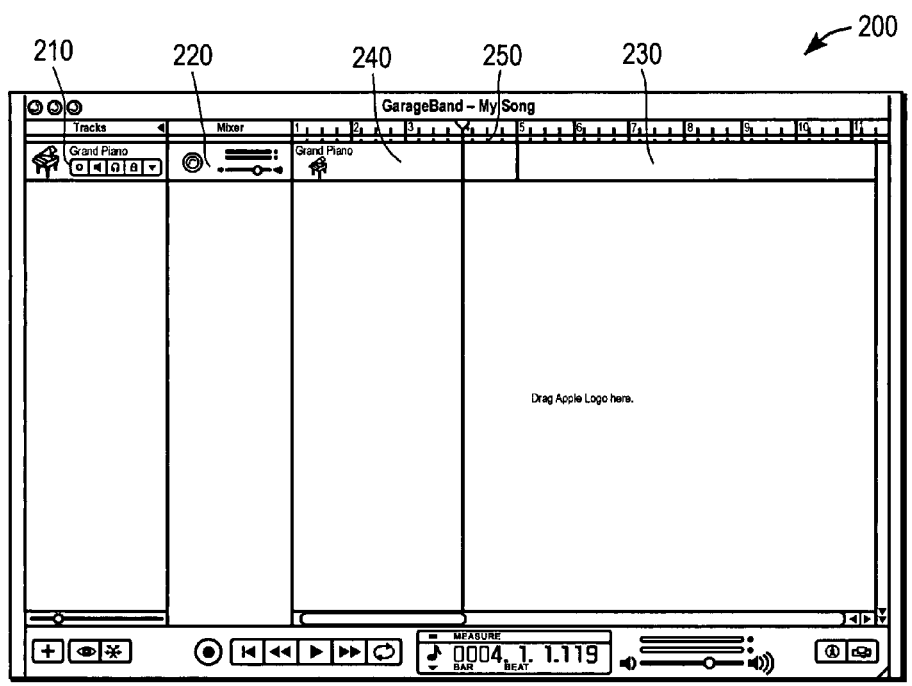
FIG. 2 is a schematic view of a user interface, in one embodiment, for producing a music project.

FIG. 2 shows an example of a user interface 200 of a program which can be used for the above mentioned purposes. Additional menu bars may be provided. In this assembly, the user interface 200 lists tracks in the left most column. The example shown features one track 210 with a piano assigned to it. The piano may be replaced by any other instrument. Further tracks with the same or other instruments or MIDI tracks may be added as needed. The user interface 200 shows a mixer 220 in the column next to the tracks. The mixer 220 is assigned to the track 210 and can be used to manipulate the output of the track 210 by e.g. changing the pan or the volume. The third column being the right most one of the user interface 200 shows the arrange area. The arrange area gives an indication of the content of the audio data belonging to the different tracks. A timeline is provided at the top of the arrange area. In this example, the timeline is divided by bars. The first line 230 of the arrange area belongs to the track 210. The first line 230 shows a music region 240 of the track 210. The part in the arrange area between the timeline at the top and the first line 230 of the arrange area is designated to indicate a region which is cycled either for recording or for playback. Regions which are cycled are marked by a darker color in the example shown. Accordingly, in FIG. 2 the music region 240 is recorded multiple times which is indicated by a cycle bar 250 which has the same start and end positions as the music region 240. The user interface 200 also features at the bottom an area with buttons for e.g. starting and stopping playback or recording along with other options.

Figure 3:
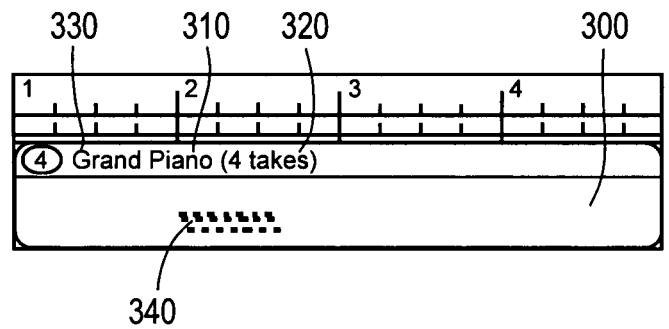
FIG. 3 is a schematic view of an embodiment of a take container.

FIG. 3 shows one possible embodiment of a take container 300. This take container 300 may be provided with a name 310, being "Grand Piano" in this example. The take container 300 may feature a first indication 320 showing how many takes are stored in the take container 300. In this example, four takes are stored in the take container 300. The first indication 320 may help the user to easily grasp how many takes are within the take folder.

The first indication 320 does not necessarily give an indication how many takes were recorded. However, an indication giving such information could be added. Nevertheless, at least certain embodiments focus on reducing the amount of information displayed in order not to confuse the user and to facilitate the handling for the user. If desired, the level of detail and the amount of information provided may be changed by setting preferences.

A second indication 330 may be provided in order to show which take of the multiple takes stored in the take container 300 is currently selected. In the example shown in FIG. 3, take 4 is currently selected. Furthermore, the second indication 330 may be implemented as an icon which can be used to open a menu.

The take container 300 may also be provided with a graphical impression 340 of the content of the currently selected take. Such a graphical impression 340 may be a schematic using symbolized notes or a waveform or some other suitable visualization.

By an embodiment such as that shown in FIG. 3, the user is able to easily recognize that this music region is a take container 300, i.e. contains multiple takes of a music region. Furthermore, the user may intuitively grasp how many takes are stored in the take container 300 and which one is currently selected. Such a take container may be created by specifying a certain part of the music project for cycle recording using the cycle bar 250 and by recording over this part then as many times as desired.

Figure 4:
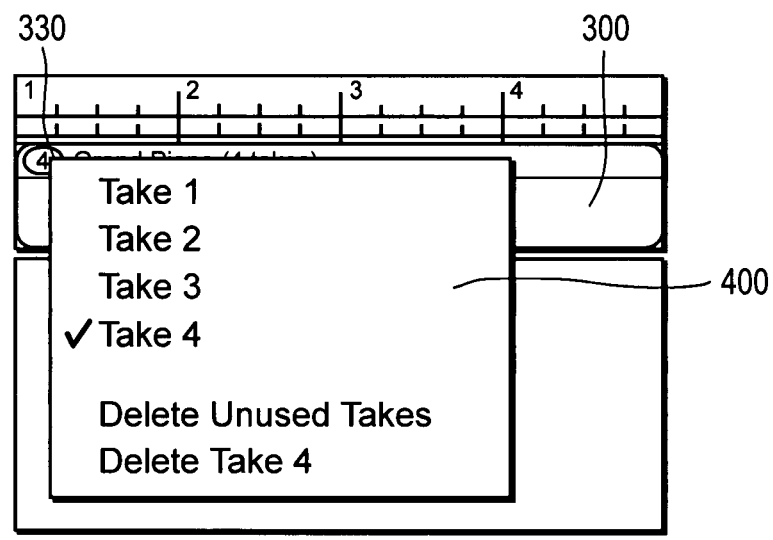
FIG. 4 is a schematic view of an embodiment of an open menu.

FIG. 4 shows the take container 300 along with an open menu 400. The menu 400 may be opened by clicking or double-clicking an icon showing the second indication 330. Alternatively, it may also be possible to open such a menu via a tool bar or some other suitable technique, such as a voice input or an input via a touch-screen. The menu 400 shows in this embodiment a list of the takes stored in the take container 300. Additionally, other options may be provided. For example, the menu 400 may feature options like "Delete Unused Takes" or "Delete Take x", wherein x stands for the currently selected take. Next, the menu 400 may be provided with a marking showing which of the takes is currently selected. Such a marking is illustrated adjacent to "Take 4" in FIG. 4. However, such a marking could also be highlighting the currently selected take or changing its text or background color or any other suitable marking.

The menu 400 may be used to select a take stored in the take container 300 different from the currently selected take. However, the menu 400 may also be used to delete certain takes of the take container 300. The user may have selected a certain take and have listened to it. Based thereon, the user may decide that this take is the one he likes best and therefore wants to delete all other takes of the take container or the user may decide that this take is to be deleted. Then the user may open the menu 400 to change his selection or to change the content of the take container accordingly.

Figure 5:
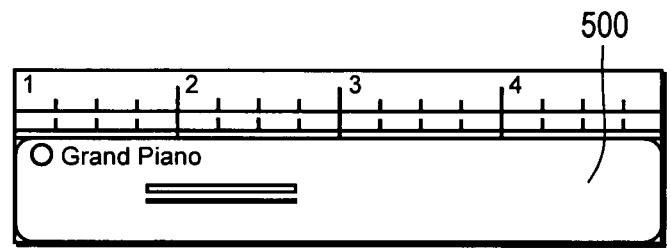
FIG. 5 is a schematic view of an embodiment of a take container containing only one take.

FIG. 5 illustrates a possible implementation for a situation where a take container 500 stores only one take. Such a case will for example occur, if the user chooses the option "Delete Unused Takes" in the menu 400 of FIG. 4. At least in certain embodiments, the take container 500 which stores only one take will not show the first and second indications illustrating how many takes are stored in the container and which take is selected. Such information may no longer be advantageous for the user.

Other implementations are within the scope of the following claims.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for recording and selecting an audio region through a user input device, the method comprising:
   receiving user input which specifies a certain audio region on a first audio track in an audio project using a graphical user interface on a display device, wherein the certain region comprises a particular start time and a particular end time within the single first audio track;
   recording multiple takes of the certain audio region of the first audio track;
   storing, in a machine readable storage device, the multiple takes of the certain audio region of the first audio track;
   storing a data structure representing a take container to store the multiple takes of the certain audio region of the first audio track;
   receiving user input that causes a selection of an entire one of the multiple takes as a currently selected take; and
   using the selected take in the certain audio region of the first audio track.

2. The method of claim 1, wherein the take container is associated exclusively with the certain audio region on the first audio track.

3. The method of claim 1, wherein the take container is displayed with a first indication showing how many takes are stored in the take container.

4. The method of claim 1, wherein the takes in the take container are numbered and wherein the take container is displayed with a second indication showing which take is currently selected.

5. The method of claim 1, wherein a menu is associated with the take container, said menu can be used to select the entire one of the multiple takes as the currently selected take.

6. The method of claim 5, wherein the menu can be accessed via an icon displaying a second indication showing which take is currently selected.

7. The method of claim 5, wherein the menu further provides for functionalities of deleting one or more takes stored within the take container or deleting all takes stored in the take container but the currently selected take.

8. The method of claim 1, comprising:
   when the take container contains more than one take, displaying a first indication showing how many takes are stored in the take container; and
   when the take container contains only one take, not displaying the first indication.

9. A non-transitory computer readable medium comprising instructions to:
   receive user input that specifies a certain region on a single first media track in a media project using a graphical user interface on a display device, wherein the certain region comprises a particular start time and a particular end time within the single first media track;
   record multiple takes of the certain region of the first media track;
   store, in a machine readable storage device, the multiple takes of the certain region of the first media track;

store a data structure representing a take container to store the multiple takes of the certain region of the first media track; and display a representation of the multiple takes that comprises a user-selectable option to select an entire one of the multiple takes as a currently selected take to be the certain region played in the first media track.

10. The computer-readable medium of claim 9, wherein the take container is associated exclusively with the first media track.

11. The computer-readable medium of claim 9, wherein the instructions are configured so that the take container is displayed with a first indication showing how many takes are stored in the take container.

12. The computer-readable medium of claim 9, wherein the instructions are configured so that the takes in the take container are numbered and wherein the take container is displayed with a second indication showing which take is currently selected.

13. The computer-readable medium of claim 9, wherein the instructions are configured so that a menu is associated with the take container, said menu can be used to select the entire one of the multiple takes as the currently selected take.

14. The computer-readable medium of claim 13, wherein the instructions are configured so that the menu can be accessed via an icon displaying the second indication showing which take is currently selected.

15. The computer-readable medium of claim 13, wherein the instructions are configured so that the menu further provides for functionalities of deleting one or more takes stored within the take container or deleting all takes stored in the take container but the currently selected take.

16. The computer-readable medium of claim 14, wherein the instructions are configured so that no first indication showing how many takes are stored in the take container and no second indication showing which take is currently selected are displayed, if the take container contains only one take.

17. A data processing system comprising an electronic display that displays a graphical user interface illustrating a first media track of a media project;

a first input device that receives user input specifying a certain region of the first media track in the media project, wherein the certain region of the first media track has a particular start time and a particular end time within the first media track;

a second input device that records multiple takes of the certain region of the first media track; and a machine readable storage device that stores the multiple takes of the certain region of the first media track and a data structure representing a take container that contains the multiple takes of the certain region of the first media track;

wherein the electronic display displays a user-selectable option to select an entire one of the multiple takes as a currently selected take to be the certain region played in the first media track.

18. The data processing system of claim 17, wherein the take container is associated exclusively with the certain region on the first media track.

19. The data processing system of claim 17, wherein the display displays the take container with a first indication showing how many takes are stored in the take container.

20. The data processing system of claim 19, wherein the takes in the take container are numbered and wherein the display displays the take container with a second indication showing which take is currently selected.

21. The data processing system of claim 17, wherein the display displays a menu associated with the take container, wherein the menu can be used to select the entire one of the multiple takes as the currently selected take.

22. The data processing system of claim 21, wherein the menu can be accessed via an icon displaying the second indication showing which take is currently selected.

23. The data processing system of claim 21, wherein the menu further provides for functionalities of deleting one or more takes stored within the take container or deleting all takes stored in the take container but the currently selected take.

24. The data processing system of claim 22, wherein the display shows no first indication showing how many takes are stored in the take container and no second indication showing which take is currently selected are displayed, if the take container contains only one take.

* * * * *